(12) United States Patent
Piccard et al.

(10) Patent No.: US 8,887,843 B2
(45) Date of Patent: Nov. 18, 2014

(54) HYBRID ELECTRIC VEHICLE AND METHOD FOR MANAGING HEAT THEREIN

(75) Inventors: Douglas Piccard, Ann Arbor, MI (US); Jin Wang, Powell, OH (US); Kevin Lloyd Newman, Farmington Hills, MI (US); Raymond C. Siciak, Redmond, WA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1526 days.

(21) Appl. No.: 12/244,104

(22) Filed: Oct. 2, 2008

(65) Prior Publication Data

US 2010/0084112 A1 Apr. 8, 2010

(51) Int. Cl.
*B60K 6/20* (2007.10)
*B60H 1/00* (2006.01)

(52) U.S. Cl.
CPC ............ *B60H 1/004* (2013.01); *B60H 1/00278* (2013.01)
USPC .................................. 180/65.21; 180/65.265

(58) Field of Classification Search
USPC .............. 180/68.2, 68.5, 65.27, 65.21, 65.31, 180/65.265; 123/41.02, 142.5 R, 179.4; 165/202, 61, 41
See application file for complete search history.

(56) References Cited

U.S. PATENT DOCUMENTS

| | | | |
|---|---|---|---|
| 5,291,960 A * | 3/1994 | Brandenburg et al. .... 180/65.27 | |
| 5,432,026 A | 7/1995 | Sahm et al. | |
| 5,553,662 A * | 9/1996 | Longardner et al. .......... 165/202 | |
| 6,047,770 A | 4/2000 | Suzuki et al. | |
| 6,059,016 A * | 5/2000 | Rafalovich et al. ............. 165/41 | |
| 6,138,466 A | 10/2000 | Lake et al. | |
| 6,332,497 B1 | 12/2001 | Niwa et al. | |
| 6,575,258 B1 * | 6/2003 | Clemmer ..................... 180/68.5 | |
| 7,013,659 B2 | 3/2006 | Yoshida et al. | |
| 7,045,236 B1 | 5/2006 | Andrew et al. | |
| 7,552,705 B2 * | 6/2009 | Serkh et al. ................ 123/179.4 | |
| 2001/0040061 A1 * | 11/2001 | Matuda et al. ............... 180/68.2 | |
| 2001/0043808 A1 * | 11/2001 | Matsunaga et al. ........... 392/494 | |
| 2005/0044873 A1 * | 3/2005 | Tamai et al. ................. 62/323.1 | |
| 2005/0167169 A1 | 8/2005 | Gering et al. | |
| 2006/0001399 A1 | 1/2006 | Salasoo et al. | |
| 2006/0284601 A1 | 12/2006 | Salasoo et al. | |
| 2009/0071428 A1 * | 3/2009 | Kamiyama et al. .... 123/142.5 R | |
| 2009/0205588 A1 * | 8/2009 | Bilezikjian et al. ........ 123/41.02 | |
| 2009/0283604 A1 * | 11/2009 | Martinchick et al. .... 237/12.3 B | |
| 2009/0314847 A1 * | 12/2009 | Nemoto et al. .................... 237/5 | |
| 2010/0089563 A1 * | 4/2010 | Sundhar et al. ............... 165/202 | |

FOREIGN PATENT DOCUMENTS

| | | |
|---|---|---|
| CN | 101214785 A | 7/2008 |
| DE | 19730678 A1 | 1/1999 |
| EP | 1108572 A2 | 10/2000 |
| GB | 2383840 A | 9/2003 |
| JP | 2001233044 A | 8/2001 |
| WO | 9302884 A1 | 2/1993 |

OTHER PUBLICATIONS

Search Report for Application No. GB 0914947.7, dated Nov. 19, 2009.

* cited by examiner

*Primary Examiner* — Hau Phan
(74) *Attorney, Agent, or Firm* — David B. Kelley; Brooks Kushman P.C.

(57) ABSTRACT

A hybrid electric vehicle includes an internal combustion engine and an electrical power storage unit. The engine and power storage unit are configured to provide motive power for the vehicle. The vehicle also includes a heater core in fluid communication with the engine, power storage unit and vehicle's cabin.

17 Claims, 1 Drawing Sheet

HYBRID ELECTRIC VEHICLE AND METHOD FOR MANAGING HEAT THEREIN

BACKGROUND

It is a known design practice to use a heater core, a radiator-like device, for heating a cabin of a vehicle. Hot coolant from the vehicle's engine may be passed through a winding tube of the core (a heat exchanger between coolant and cabin air.) Fins attached to the core tubes may increase the surface area for heat transfer to air that is forced past them by a fan, for example, to heat the passenger compartment.

Once the engine has warmed up, the coolant may be kept at a generally constant temperature in a known fashion by a closed-loop control system that includes a thermostat. The temperature of air entering the vehicle's cabin may be controlled by a valve that limits the amount of coolant passing through the heater core. Alternatively, the heater core may be blocked off, or partially blocked off, by a valve that directs part or all of the incoming air around the heater core. Some systems allow a driver to control the valve directly by means of, for example, a rotary knob or lever. Other systems may use electronics to control the valve.

Vehicles with dual climate control functions (allowing a driver and passenger to each set a different temperature) may use a heater core split in two, where different amounts of coolant may flow through the heater core on either side of the split to obtain the desired heating.

Because the heater core cools the heated coolant from the engine, it may act as a secondary radiator for the engine. If the primary radiator is working improperly, an operator may turn the heat on in the passenger cabin, resulting in some cooling of the engine.

SUMMARY

A hybrid electric vehicle includes an internal combustion engine and an electrical power storage unit. The engine and power storage unit are configured to provide power for moving the vehicle. The vehicle also includes a heater core, a first fluid line connecting the heater core and engine, and a second fluid line connecting the power storage unit, heater core and vehicle's cabin. The heater core is configured to transfer heat between the first fluid line and the second fluid line.

A hybrid electric vehicle includes an internal combustion engine and an electrical power storage unit. The engine and power storage unit are configured to provide power for moving the vehicle. The vehicle also includes a heater core in fluid communication with the engine, power storage unit and vehicle's cabin.

A method for managing heat in a hybrid electric vehicle includes passing a first fluid over one of an engine and traction battery to transfer heat to the first fluid, transferring the heat from the first fluid to a second fluid, and passing the second fluid over the other of the engine and traction battery.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
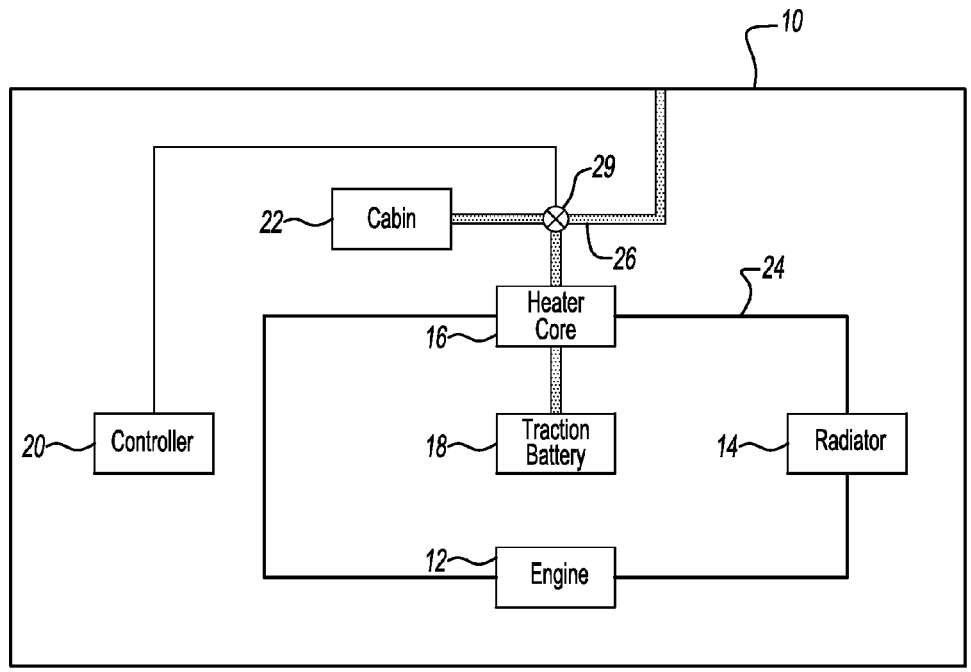
FIG. 1 is a block diagram of a hybrid electric vehicle according to an embodiment of the invention.

Referring now to FIG. 1, an embodiment of a hybrid electric vehicle 10 may include an engine 12, radiator 14 and heater core 16. The vehicle 10 may also include a traction battery 18 (or other suitable electrical power storage device), controller 20 and cabin 22. As known in the art, the engine 12 may provide power for moving the vehicle 10; the traction battery 18 may also provide power for moving the vehicle 10 (via an electric machine).

The engine 12, radiator 14 and heater core 16 are connected via a fluid loop 24, e.g., piping. The heater core 16, traction battery 18, cabin 22 and exterior of the vehicle 10 are connected via a fluid line 26, e.g., an air duct. The fluid line 26 includes a valve 29 that may direct fluid to the cabin 22 and/or exterior of the vehicle 10. The controller 20 may selectively control the valve 29. As apparent to those of ordinary skill in the art, pumps, blowers, etc., (not shown) may be used to move the fluids within the fluid loop 24 and/or fluid line 26. The controller 20 may also selectively control these pumps, blowers, etc. (It is assumed that such techniques for moving the fluids within the fluid loop 24 and/or fluid line 26 are known and need not be discussed in further detail.)

The fluid loop 24 may direct fluid, e.g., a coolant, that receives heat from the engine 12 (thus raising the temperature of the coolant) to cool the engine 12 and carries this heat to the radiator 14. The radiator 14 may then dissipate the heat (thus lowering the temperature of the coolant.) Similarly, the fluid may carry heat from the engine 12 to the heater core 16. The heater core 16 may transfer this heat to air in the fluid line 26. This heated air may then be used to heat the cabin 22.

The fluid line 26 may direct fluid, e.g., air, that receives heat from the traction battery 18 (thus raising the temperature of the air) to cool the traction battery 18 and carries this heat to the heater core 16. As discussed in more detail below, the heater core 16 may or may not transfer this heat to the fluid in the fluid line 24. This heated air may then be used to heat the cabin 22 and/or exhausted to the exterior of the vehicle 10 by selective control of the valve 29. Heating the cabin 22 with heat generated by the traction battery 18 may reduce the need to start the engine 12 for the purpose of heating the cabin 22.

As discussed above, heat generated by the engine 12 and/or traction battery 18 may be used to heat the cabin 22. Heat generated by the traction battery 18, however, may also be used to heat the engine 12. For example, heat generated by the traction battery 18 may be transferred to the fluid in the fluid loop 24 via the heater core 16 (provided the temperature of the fluid in the fluid loop 24 is less then the temperature of the air in the fluid line 26). The fluid in the fluid line 24 may then be used to pre-heat the engine 12 (provided the temperature of the fluid in the fluid loop 24 is greater than the temperature of the engine 12) prior to engine start to, for example, improve cold start emissions of the engine 12. Similarly, the fluid in the fluid line 24 may be used to indirectly raise the operating temperature of the engine 12. (Because the fluid in the fluid line 24 will have a higher temperature, the rate of heat transfer from the engine 12 to the fluid in the fluid loop 24 will be less than otherwise.) Higher operating temperatures of the engine 12 may raise exhaust temperatures, which in turn may reduce or eliminate the need for post-injection of fuel into the combustion chamber (not shown) for particulate filter "light-off" and regeneration.

Likewise, heat generated by the engine 12 may be used to heat the traction battery 18. For example, heat generated by the engine 12 may be transferred to the air in the fluid line 26 via the heater core 16 (provided the temperature of the fluid in the fluid loop 24 is greater than the temperature of the air in the fluid line 16). This heated air may then be directed over the traction battery 18 (using, for example, any suitably configured blower). Such heating may reduce, for example, the tendency of the traction battery 18 to become power limited due to low internal cell temperatures in cold environments.

The controller 20 may act to operate the elements as described above based on, for example, user input to a climate control system (not shown) and temperature readings from temperature sensors (not shown) associated with the engine 12, traction battery 18, fluid loop 24, etc. (It is assumed that such techniques for receiving such input and detecting such temperatures are known and need not be discussed in further detail.) As an example, the controller 20 may receive a command to heat the cabin 22. The controller 20 may then determine whether to use heat which has been generated by the engine 12 and/or traction battery 18 based on whether the engine 12 and/or traction battery 18 have heat available to reject. If the engine 12 is "off" (no heat available), the controller 20 may operate a suitably configured blower (not shown) to provide heat generated by the traction battery 18 to the cabin 22 via the fluid line 26. As another example, the controller 20 may receive a command to pre-heat the engine 12 prior to a cold start. The controller 20 may operate a suitably configured pump (not shown) in the fluid line 24 and a suitably configured blower (not shown) in the fluid line 26 such that heat generated by the traction battery 18 is transferred to the fluid in the fluid line 24 via the heater core 16. This heat may then be carried by the fluid in the fluid line 24 to the engine 12. Other control scenarios are also possible.

Figure 2:
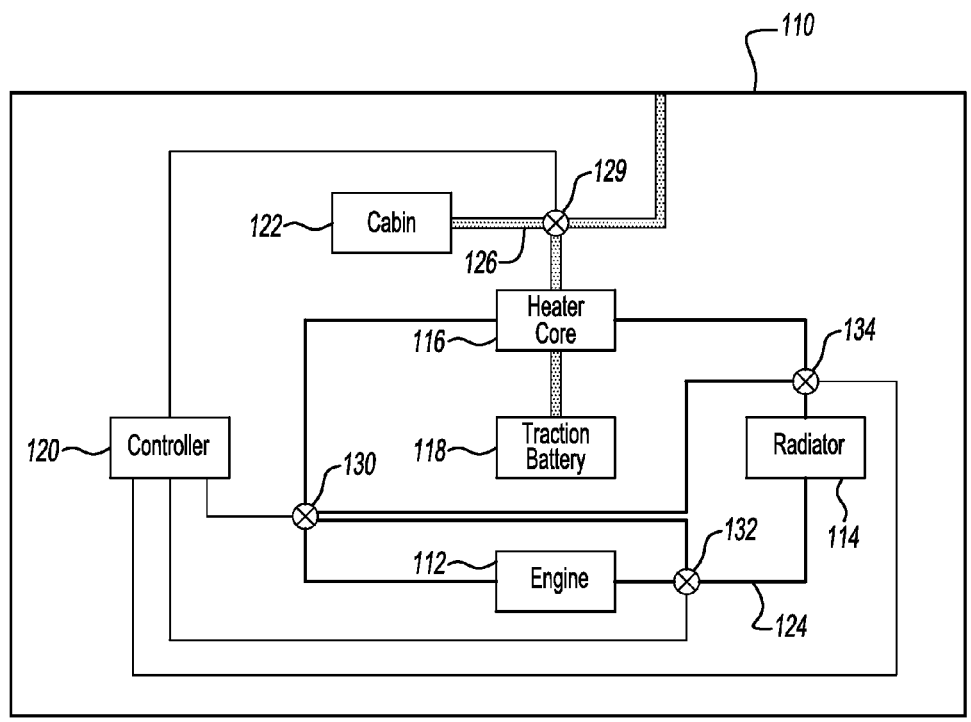
FIG. 2 is a block diagram of a hybrid electric vehicle according to another embodiment of the invention.

Referring now to FIG. 2, numbered elements that differ by 100 relative to the numbered elements of FIG. 1 have similar, although not necessarily identical, descriptions to the numbered elements of FIG. 1. Another embodiment of a hybrid electric vehicle 110 may include an engine 112, radiator 114 and heater core 116. The vehicle 110 may also include a traction battery 118, controller 120 and cabin 122.

The engine 112, radiator 114 and heater core 116 are fluidly connected via a fluid loop 124. The fluid loop 124 includes valves 130, 132, 134 that, as discussed below, may be used to bypass the engine 112 and/or radiator 114. In other embodiments, however, any suitable valving arrangement is possible. The heater core 116, traction battery 118, cabin 122 and exterior of the vehicle 110 are fluidly connected via a fluid line 126. The fluid line 126 includes a valve 129 that may direct fluid to the cabin 122 and/or exterior of the vehicle 110. The controller 120 may selectively control the valves 129, 130, 132, 132. As mentioned above, pumps, blowers, etc., (not shown) may be used to move the fluids within the fluid loop 124 and/or fluid line 126. The controller 120 may also selectively control these pumps, blowers, etc.

As discussed with reference to FIG. 1, heat generated by the engine 112 and/or traction battery 118 may be used to heat the cabin 122, heat generated by the traction battery 118 may be used to heat the engine 112, and heat generated by the engine 112 may be used to heat the traction battery 118. The selective control of the valves 130, 132, 132, however, in possible combination with the techniques described above may provide further control over the heat transfer between the engine 112, traction battery 118 and/or cabin 122. As an example, the controller 120 may actuate the valve 130 to reduce the flow rate of coolant to the engine 112 to reduce the rate of heat transfer from the engine 112 to the coolant in the fluid line 124. This may raise the operating temperature of the engine 112 and thus raise exhaust temperatures for filter "light-off." As another example, the controller 120 may actuate the valves 130, 132 to bypass the engine 112 to raise the operating temperature of the engine 112. As yet another example, the controller 120 may actuate the valves 130, 134 to bypass the engine 112 and the radiator 114. This may allow the heater core 116 to substantially raise the temperature of the fluid in the fluid loop 124 with heat generated by the traction battery 118 prior to pre-heating the engine 112 before a cold start. Other scenarios and arrangements are, of course, also possible.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A hybrid electric vehicle having a cabin, the vehicle comprising:
    an internal combustion engine;
    an electrical power storage unit, the engine and power storage unit configured to provide power for moving the vehicle;
    a heater core;
    a first fluid line connecting the heater core and engine; and
    a second fluid line connecting the power storage unit, heater core and cabin, the heater core configured to transfer heat between the first fluid line and the second fluid line.

2. The vehicle of claim 1 wherein the first fluid line includes a first fluid, the first fluid comprising a coolant.

3. The vehicle of claim 2 wherein the coolant comprises a liquid.

4. The vehicle of claim 2, wherein the first fluid line forms a fluid loop including at least one valve configured to direct the coolant around the engine to bypass the engine.

5. The vehicle of claim 1 wherein the second fluid line includes a second fluid, the second fluid comprising air.

6. The vehicle of claim 5 wherein the second fluid line includes a valve configured to direct the air to at least one of the cabin and the vehicle's exterior.

7. A hybrid electric vehicle having a cabin, the vehicle comprising:
    an internal combustion engine;
    an electrical power storage unit, the engine and power storage unit configured to provide power for moving the vehicle; and
    a heater core in fluid communication with the engine, power storage unit and cabin.

8. The vehicle of claim 7 further comprising a first fluid line connecting the heater core and engine.

9. The vehicle of claim 8 wherein the first fluid line includes a first fluid, the first fluid comprising a coolant.

10. The vehicle of claim 9 wherein the coolant comprises a liquid.

11. The vehicle of claim 9, wherein the first fluid line forms a fluid loop including at least one valve configured to direct the coolant around the engine to bypass the engine.

12. The vehicle of claim 8 further comprising a second fluid line connecting the power storage unit, heater core and cabin.

13. The vehicle of claim 12 wherein the second fluid line includes a second fluid, the second fluid comprising air.

14. The vehicle of claim 13 wherein the second fluid line includes a valve configured to direct the air to at least one of the cabin and the vehicle's exterior.

15. A method for managing heat in a hybrid electric vehicle comprising:
 passing a first fluid over one of an engine and traction battery to transfer heat to the first fluid;
 transferring the heat from the first fluid to a second fluid; and
 passing the second fluid over the other of the engine and traction battery.

16. The method of claim 15 wherein the heat from the first fluid is transferred to the second fluid via a heater core.

17. The method of claim 15 wherein one of the first and second fluids comprises air and the other of the first and second fluids comprises a liquid coolant.

* * * * *